United States Patent [19]
Sawyer et al.

[11] Patent Number: 5,901,482
[45] Date of Patent: May 11, 1999

[54] DISPLAY CARD HOLDER FOR A SHOPPING CART

[75] Inventors: Thomas E. Sawyer; Vance N. Kirby; James E. Hoback, all of Valencia, Calif.

[73] Assignee: TV Fanfare Publications, Inc., Valencia, Calif.

[21] Appl. No.: 08/885,459

[22] Filed: Jun. 27, 1997

Related U.S. Application Data

[63] Continuation of application No. 08/555,303, Nov. 8, 1995, abandoned, which is a continuation of application No. 08/156,758, Nov. 23, 1993, abandoned.

[51] Int. Cl.⁶ ............................................... G09F 3/00
[52] U.S. Cl. ..................... 40/308; 40/611; 280/33.992
[58] Field of Search ........................... 40/309, 611, 706, 40/707, 781, 790, 209, 642.02, 661; 280/33.991, 33.992; 224/277

[56] References Cited

U.S. PATENT DOCUMENTS

| | | |
|---|---|---|
| 1,116,942 | 11/1914 | Smith . |
| 1,879,554 | 9/1932 | Simkins . |
| 2,111,780 | 3/1938 | Horton . |
| 2,361,479 | 10/1944 | Joffo . |
| 2,507,578 | 5/1950 | Schillperoort . |
| 3,024,554 | 3/1962 | Kempher . |
| 3,677,570 | 7/1972 | Hedu .................................. 40/308 X |
| 3,956,841 | 5/1976 | Hensel . |
| 4,182,062 | 1/1980 | Krokos et al. ............................. 40/209 |
| 4,217,711 | 8/1980 | Spresser et al. .......................... 40/308 |
| 4,238,897 | 12/1980 | Byers . |
| 4,475,300 | 10/1984 | Ledenican . |
| 4,518,080 | 5/1985 | Ohlson . |
| 4,728,238 | 3/1988 | Chisholm et al. . |
| 4,765,074 | 8/1988 | Loos .......................................... 40/661 |
| 4,765,077 | 8/1988 | Rosenthal et al. ........................ 40/308 |
| 4,773,175 | 9/1988 | Larsen . |
| 4,805,331 | 2/1989 | Boggess et al. . |
| 4,871,209 | 10/1989 | Handelman . |
| 5,306,033 | 4/1994 | Evans ................................. 280/33.992 |
| 5,363,575 | 11/1994 | Sawyer et al. ............................ 40/308 |
| 5,608,978 | 3/1997 | Sawyer et al. . |

FOREIGN PATENT DOCUMENTS

| | | |
|---|---|---|
| 543109 | 7/1957 | Canada . |
| 1317759 | 5/1993 | Canada . |
| 2005915 | 6/1995 | Canada . |
| 341029 | 11/1989 | European Pat. Off. .......... 280/33.992 |
| 2440891 | 3/1976 | Germany . |
| 3502791 | 7/1986 | Germany . |
| 408628 | 9/1966 | Switzerland . |
| 23570 | of 1899 | United Kingdom . |
| 202749 | 8/1923 | United Kingdom . |
| 1248451 | 10/1971 | United Kingdom . |
| 1511496 | 5/1978 | United Kingdom . |
| 2217504 | 10/1989 | United Kingdom . |
| 2231432 | 11/1990 | United Kingdom ..................... 40/308 |

*Primary Examiner*—Brian K. Green
*Attorney, Agent, or Firm*—Leob & Leob LLP; John P. Scherlacher

[57] ABSTRACT

A display card holder which securely holds and displays a directory card or the like for use in connection with shopping baskets. The holder has releasable outer frame member which clamps the card to a backing member. The backing member is coupled to the shopping basket by means of a fastening device. The fastening device has a portion which engages the card and in combination with the outer frame member further ensures the clamping of the card to the backing member.

17 Claims, 4 Drawing Sheets

DISPLAY CARD HOLDER FOR A SHOPPING CART

This is a continuation of application Ser. No. 08/555,303 filed on Nov. 8, 1995, now abandoned, which in turn is a continuation of application Ser. No. 08/156,758, filed Nov. 23, 1993, now abandoned.

BACKGROUND OF THE INVENTION

1. Field of the Invention

The present invention relates generally to a directory frame for use in combination with a shopping cart, and more particularly to a directory frame of a display card holder which receives a shopping directory card or advertisement placard and which may be removably attached to a shopping cart.

2. Description of Related Art

In general, large shopping centers and food markets typically have thousands of items of products stacked on shelves and arranged in aisles. These thousands of products are typically grouped together wherein they are essentially the same product but differ in brand or manufacturer. As is often the case, the department store or food store can assist the shopper by indicating in which aisles particular items my be found. For example, a shopping directory may be hung from a ceiling or placed in a stand at either end of an aisle. There are several problems associated with directories which must be hung from the ceiling over a particular area of the store or above a certain aisle. For example, in a very large store it is often difficult to see what is in a particular aisle or in a particular section of the store when one is located at the opposite end of the store. Also, because the printing on such directories must be large enough to be readable from a distance, fewer items can be listed on such a directory. Finally if the store relocates a certain product, the directory will have to be changed or replaced.

In an effort to solve such problems, the applicant's co-pending application No. 08/093,514, filed Jul. 19, 1993, describes a directory holder which may be mounted directly on a shopping cart. The directory holder of this reference allows directory and advertising placards or cards to be carried directly on the shopping cart for easy reference by a shopper. The directory holder may comprise a pair of backing members which are mounted back-to-back in the area of the basket of the shopping cart, with a vertical wire wall of the cart positioned between the pair of directory holders. In particular, the directory holder has a frame member which is removably attached to each of the backing member with the aid of a coupling device. Moreover, the directory holder is designed so that the frame member can withstand frequent collisions with other shopping carts and yet allow the placard retained between the backing member and the frame member to be easily changed to substitute a revised directory or a new advertisement.

However, for some applications, it may be desirable that the directory holder be much more compact and thinner without sacrificing the durability and the ability to easily change the placard. In addition, it may also be desirable to simplify the structure of a mechanism to clamp the placard between the backing member and the frame member without sacrificing the effectiveness in clamping the placard therebetween.

SUMMARY OF THE INVENTION

It is an object of the present invention to provide an improved directory holder for a shopping cart, obviating, for practical purpose, the above mentioned limitations, particularly in a manner requiring a relatively uncomplicated mechanical arrangement.

This and other objects and advantages are achieved in a directory holder which is compact and simple in structure and which securely holds a directory or advertising placard in place yet allows the placard to be readily released. This is achieved by, in accordance with one aspect of the present invention, a directory holder having a backing member and a separate outer frame member having an improved design for holding the placard therebetween.

In the illustrated embodiment, the backing member has a plurality of protrusions and the outer frame member has a plurality of recesses to receive the protrusions. When the outer frame is securely attached to the backing member by a fastening device, the outer frame member clamps the periphery of the placard to the backing member. Moreover, the placard may also be clamped at its periphery between the protrusions in the backing member and the recesses in the outer frame member.

A second matching backing member, placard, and frame member assembly is mounted back-to-back with the first backing member, placard, and the frame member assembly to the shopping cart with a wall of the shopping cart therebetween. The first and second backing members are mounted to the shopping cart by a coupling device which is provided independent of the fastening device. In one aspect of the present invention, the coupling device includes screws having protruding heads which provide at least some of the aforementioned protrusions for securing the placard in place. In addition, the backing member is independent of the outer frame fastening device. As a result, the fastening device allows the outer frame member to be released from and reattached to the backing member independently of the coupling between the backing member and the basket.

DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

Figure 1:
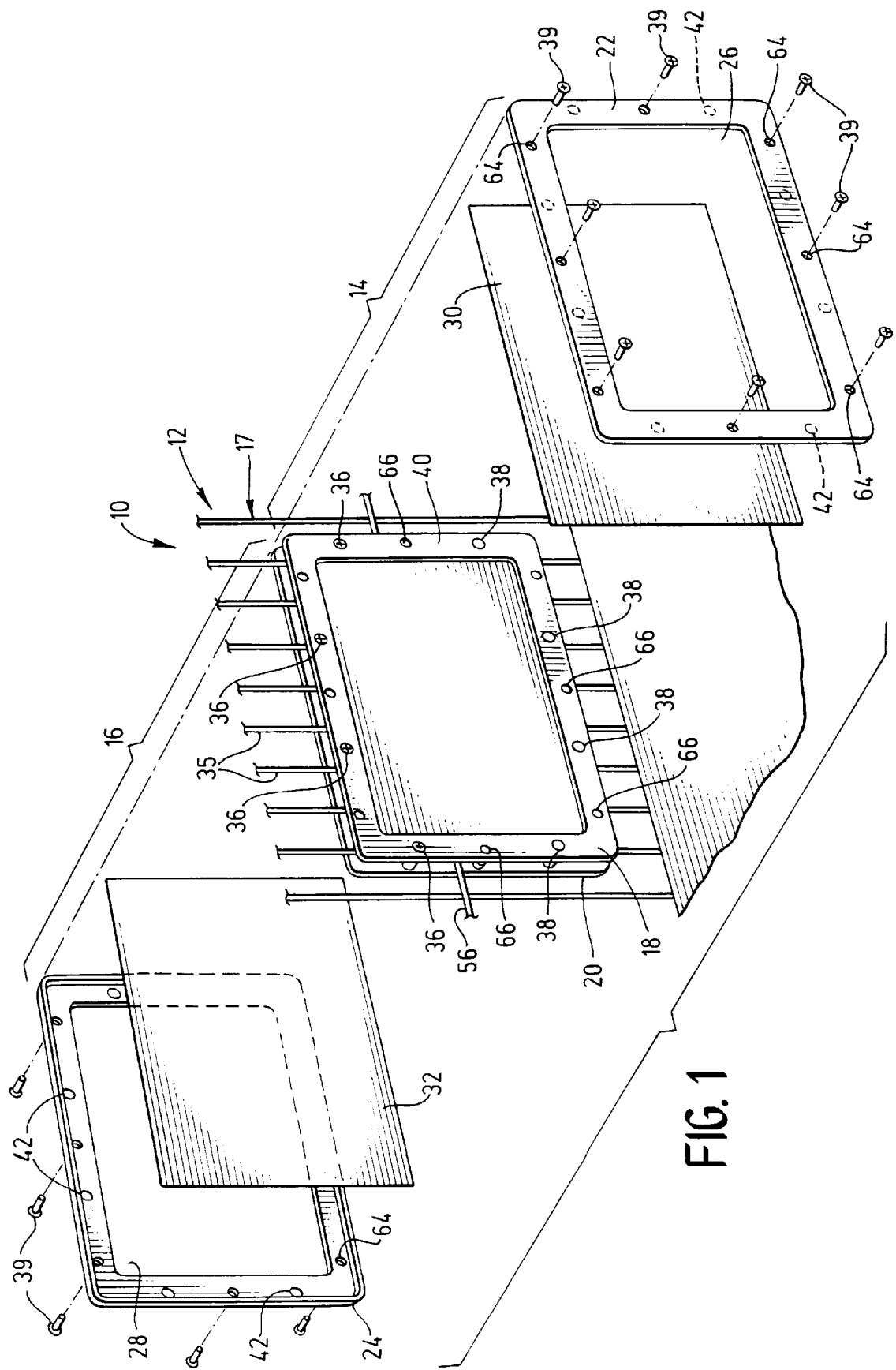
FIG. 1 is an exploded perspective view of a part of a typical shopping cart illustrating directory holders in accordance with a preferred embodiment of the present invention together with directories as they would be mounted on the wire supports of the shopping cart.

FIG. 1 shows a portion of a shopping cart 10 typically provided by department stores and supermarkets for the convenience of shoppers. The shopping cart 10 generally comprises a wire basket for holding items removed from the shelves in the supermarket. Most shopping carts have a child seat 12 which allows a child to sit in the cart 10. Supporting the seat is a wire wall section 17. In the illustrated embodiment, two directory holders 14 and 16 are mounted back-to-back to the wire wall section 17 of the child seat 12. The wire wall section 17 of the child seat is sandwiched between the two directory holders, one of which faces inward and the other of which faces outward of the child seat area.

Figure 2:
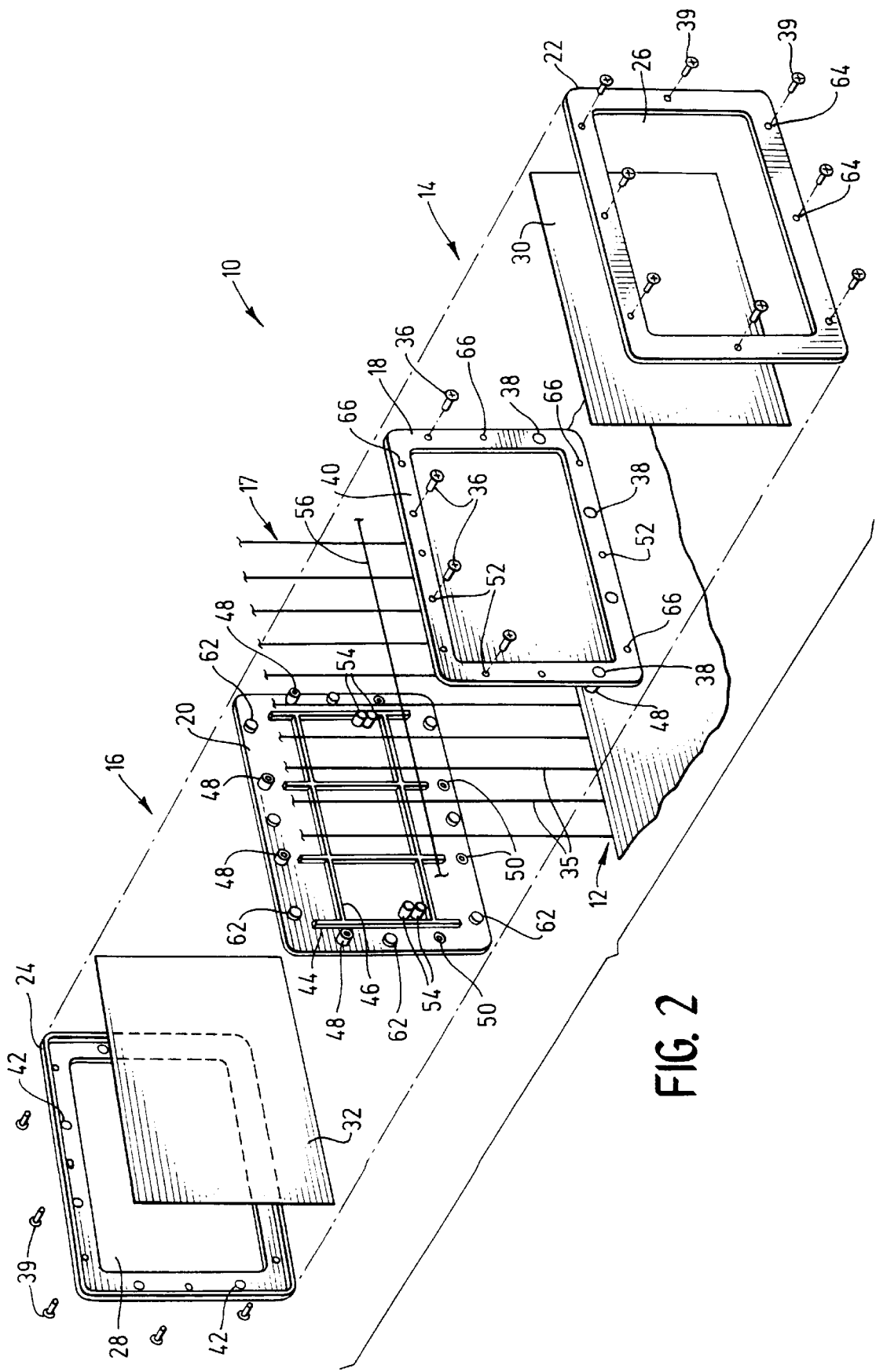
FIG. 2 is a detailed exploded perspective view of the various components of one embodiment of the directory holder of the present invention.

Referring to FIG. 2, the assembly of the directory holders 14 and 16 on the wire wall section 17 of the child seat is more clearly shown. Each directory holder is substantially made up of two sections: a backing member or plate (18, 20) which is substantially planar and generally rectangular and an outer bezel or frame (22, 24) defining a central display window (26, 28). The outer frame (22, 24) may preferably have a periphery of substantially the same size and shape of at least a portion of the periphery of the backing plate (18, 20). The two sections may be made of any suitable material, such as plastic. A directory or advertising placard (30, 32) is sandwiched between the backing plate (18, 20) and the outer frame member (22, 24) through which the directory information is displayed.

The backing plate 18 of one of the directory holders is placed against the inside of the wire wall section 17 of the child seat and the backing plate 20 of the other directory holder 16 is placed against the outside of the wire wall section 17 of the child seat such that the directory holders 14 and 16 sandwich the wire wall section 17. The directories 14 and 16 are secured together using a number of fasteners 36 around the perimeter of the backing plates 18 and 20 in an area adjacent the periphery thereof. Preferably, the fasteners 36 used in this embodiment are screws. Alternatively, rivets, barbed typed fasteners, or any other suitable fastener may be used to fasten the backing plates 18 and 20 together. The backing plates 18 and 20 are provided with a number of button-like protrusions 38 around their respective periphery. As will be described in greater detail below with reference to FIGS. 3 and 4, the button-like protrusions 38 and the heads 37 of the screws 36, combined with the outer frame members 22 and 24, effect secure retaining of the directory cards 30 and 32.

The outer frame members 22 and 24 are secured respectively to the backing plates 18 and 20 using a number of fasteners 39. The outer frame members 22 and 24 have a plurality of recesses 42 in their respective inner surfaces. In one aspect of the present invention, when the directories 14 and 16 are fully assembled, the button-like protrusions 38 protruding on the surface of the backing plates 18 and 20 mate with the recesses 42 provided in the inner surface of the respective outer frame members 22 and 24.

Figure 3:
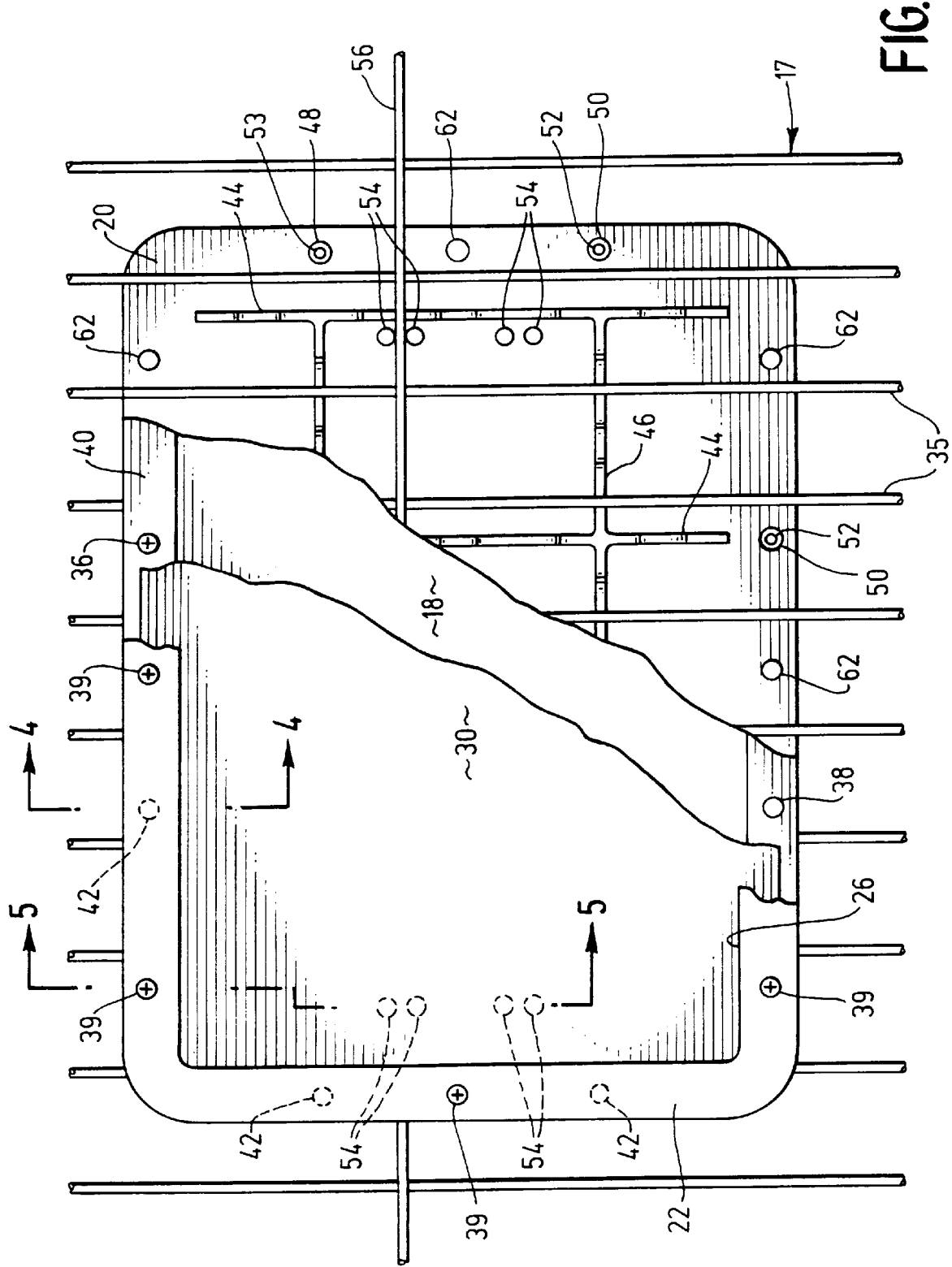
FIG. 3 is a front elevation view of the directory holder of FIG. 2.

FIG. 3 shows a front view of the fully assembled directory holders. The directory card 30 is a little larger than the display window 26 of the outer frame 22 so that the periphery of the card 30 is clamped between the backing plate 18 and the outer frame member 22. Preferably, the backing plate 18 may have on its front surface a raised rim portion 40 (FIG. 4) around the periphery. When the directory card 30 is clamped between the backing plate 18 and the outer frame member 22, the raised rim portion 40 clamps the directory card 30 to the outer frame member 22 to further ensure the secure retaining of the card 30. The rear surface of the respective backing plates 18 and 20 may be provided with longitudinal ribs 44 and horizontal ribs 46 to increase the stiffness and rigidity of the backing plate. In addition, the ribs 44 and 46 may be scalloped to facilitate gripping a wire between ribs of opposing backing plates.

Figure 4:
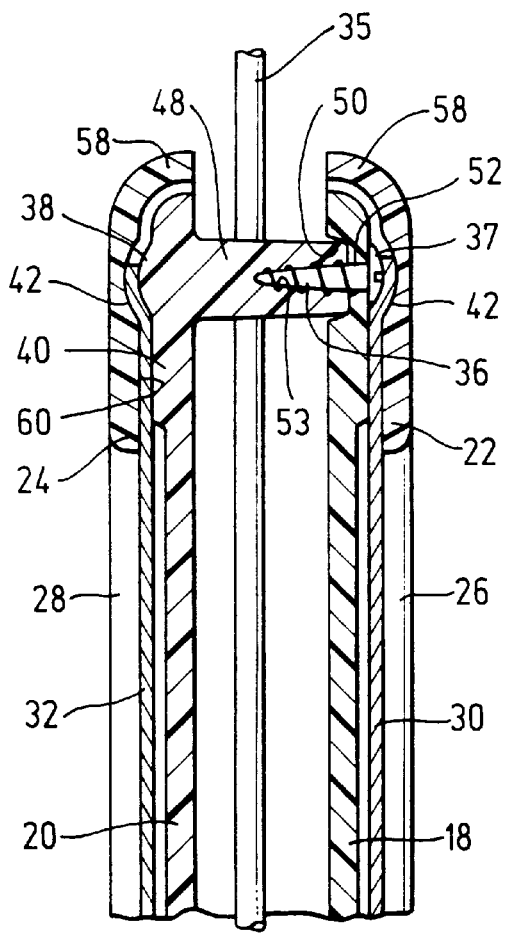
FIG. 4 is a sectional view taken along line 4—4 in FIG. 3.

As shown in FIGS. 2 to 4, also provided on the rear surface of each of the backing plates 18 and 20 are studs 48 and recesses 50. As shown in FIG. 4, the studs 48 and recesses 50 of one of the backing plates are located to mate with the corresponding recesses 50 and studs 48, respectively, provided on the other backing plate. The mating of the studs 48 and recesses 50 will facilitate the alignment and therefore the assembly of the backing plates 18 and 20 one to the other. Each of the recesses 50 of the backing plates 18 and 20 defines a hole 52 to receive a fastener 36 which threads into a hole 53 of the corresponding stud 48 received by the recess 50. The fasteners 36 may be of any type which preferably has a relatively large head portion 37, such as rivets and screws. As best seen in FIG. 4, the screws 36 are screwed through the holes 52 of the recesses 50 and into the holes 53 of the studs 48 to connect the backing members 18 and 20 together. When the backing plates 18 and 20 are connected to each other using the screws 36, the screw head portions 37, like the protrusions 38, may protrude from the surface of the respective backing plates. In a preferred embodiment, the screw head portions 37 may engage a corresponding number of recesses 42 defined in the inner surface of the respective outer frame members 22 and 24. The studs 48 have a predetermined height to serve as spacers between the backing plates 18 and 20. The studs 48 are spaced across the rear surface adjacent the periphery of the respective backing plates 18 and 20 and may be dimensioned so that they will fit between adjacent wires 35 of the wire wall.

Figure 5:
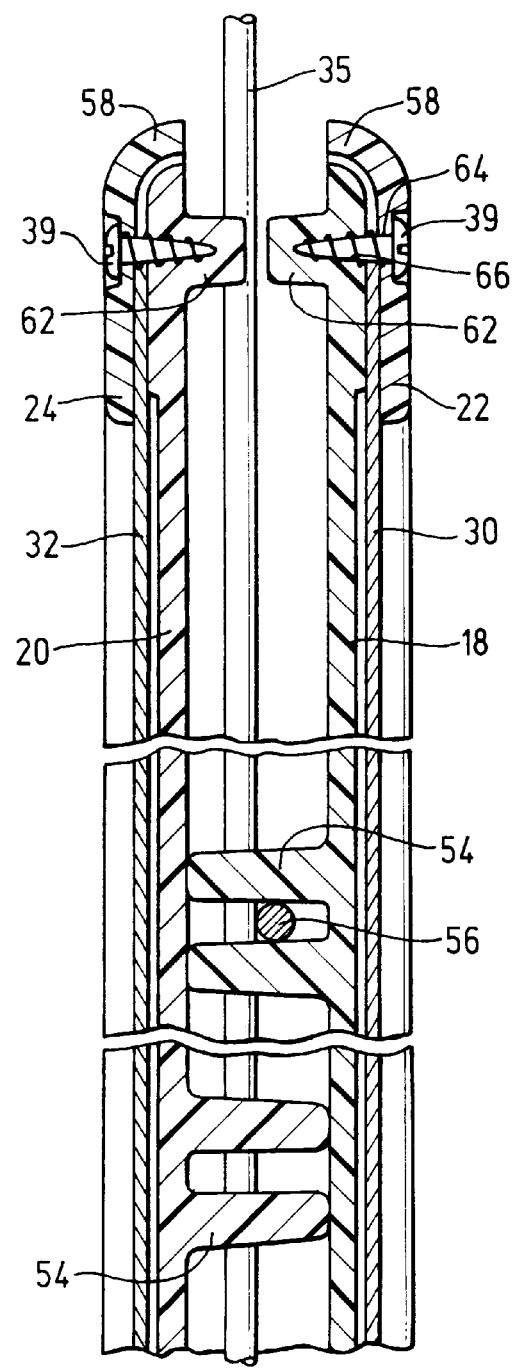
FIG. 5 is a sectional view taken along line 5—5 in FIG. 3.

Each of the backing plates 18 and 20 is also provided with a number of pairs of closely spaced fingers 54 on the rear surface. As best seen in FIG. 5, the pairs of fingers 54 are arranged generally vertically on the rear surface of each of the backing plates 18 and 20. Each finger 54 may be spaced a distance from the other finger of the pair so that a horizontal bar 56 of the wire wall section 17 will closely fit between at least one pair of the fingers 54. As a result, the fingers 54 substantially prevent the assembled directory holders 14 and 16 from shifting up and down on the wire wall section 17 of the child seat of the shopping cart.

The height of the fingers 54 and the studs 48 are chosen such that the backing plates 18 and 20 are spaced on either side of the rows of wires and the backing plates. The height of the fingers 54 and the studs 48 may be chosen such that the wire wall section 34 of the child seat may be clamped between the backing plates 18 and 20 when the directory holders are assembled.

Referring to FIG. 4, the outer frame member 22 has an outer rim 58 or lip that extends over the periphery of the backing plate 18. The directory card 30 is sandwiched between the raised rim portion 40 extending around the periphery of the backing plate 18 and an inner surface 60 of the outer frame member 22. As shown in FIG. 4, the directory card 30 may be dimensioned so that the card 30 is also sandwiched between the screw head portions 37 and the recesses 42 of the outer frame member inner surface 60 and also between the button-like protrusions 38 of the backing plate 18 and the recesses 42 to further ensure the secure clamping of the directory card 30. More particularly, it is noted that the screw head portions 37 and the button-like protrusions 38 bite into the directory card 30 to firmly clutch the peripheral portion of the directory card 30. The outer frame members 22 and 24 are secured to the respective backing plates 18 and 20 using screws 39 which are similar to the screws 36. As shown in FIG. 5, a plurality of support pads 62 are provided on the rear surface of the respective backing plates 18 and 20 to receive the screws 39 which pass through an aperture 64 (FIG. 2) in the outer frame members, through an aperture 66 of the backing plates and into the support pads 62. In this embodiment, the support pads 62 may have a height substantially shorter than that of the pads 54 and the studs 48.

In a preferred embodiment of the present invention, the studs 48, the recesses 50, fingers 54 and the support pads 62 are so arranged on the rear surfaces of the respective backing plates 18 and 20 that the backing plates 18 and 20 are identically formed. On assembling the directory holders 14 and 16 together, one of the backing plates is reversed with respect to the other backing plate so that all the studs 48 and recesses 50 provided on one of the backing plates mate with the corresponding recesses 50 and studs 48 provided on the other backing plate. In like manner, the outer frame members 22 and 24 may be identically formed by arranging the location of the recesses 42 provided in the inner surface of the respective outer frame members 22 and 24 with respect to the location of the button-like protrusions 38 and the heads 37 of the fasteners 36.

To provide symmetry, the protrusions 38 on one backing plate are aligned with a protruding screw head 37 on the other backing plate, as shown in FIG. 4. While the invention has been described with respect to the preferred embodiments in accordance therewith, it will be apparent to those skilled in the art that various modifications and improvements may be made without departing from the scope and spirit of the invention. For example, although the present invention is described with reference to a shopping cart, the present invention can be applied to shopping baskets or other types of containers for the same display purpose. The directory holder may be attached to any part of the wire basket of the shopping cart, e.g., to the wire basket of a shopping cart. The backing plate of the directory holder may be perforated to reduce material and weight. A transparent cover sheet may be placed between the directory card and the outer frame member to provide a protective cover for the directory card. Accordingly, it is to be understood that the invention is not to be limited by the specific illustrated embodiments, but only by the scope of the appended claims.

What is claimed is:

1. A display card holder being adapted for use with a shopping cart having a wall, the display card holder comprising:

a card;

a first backing member having a periphery and a plurality of protrusions adjacent to the periphery, the periphery including at least a side edge;

first coupling means for coupling said first backing member to a shopping cart wall;

a first outer frame member having a periphery of substantially the same size and shape of at least a portion of the periphery of said first backing member and a plurality of recesses to receive said plurality of protrusions provided on said first backing member, at least one of the plurality of protrusions in the backing member having a card engaging surface engaging the card and at least one of the plurality of the recesses having a card clamping surface being positioned in alignment with the card engaging surface; and a first plurality of fasteners for releasably fastening the first outer frame member and the first backing member together;

wherein the card is clamped by the card engaging surface of said one protrusion of the backing member within said one recess of the outer frame member.

2. A display card holder as in claim 1, wherein said first plurality of fasteners are adapted to clamp the card at its periphery between said plurality of protrusions and said plurality of recesses.

3. A display card holder as in claim 1, wherein said first coupling means includes a plurality of screws to be screwed through said first backing member adjacent to the periphery thereof, said screws having heads being positioned opposite a corresponding number of said plurality of recesses in said first outer frame member, the heads of the screws having card engaging surfaces engaging the card in alignment with said corresponding number of recesses when said first outer frame member and said first backing member are fastened to each other.

4. A display card holder as in claim 1, wherein the first outer frame has a lip adapted to overhang and cover at least a portion of the side edge of the periphery of the first backing member.

5. A display card holder as in claim 1, wherein said first backing member includes at least one pair of holding pins for substantially preventing a vertical movement of said first backing member with respect to the wall of the cart.

6. A display card holder as in claim 1 further comprising:

a second backing member, the second backing member having a periphery, the periphery including at least a side edge;

a second outer frame member;

a second plurality of fasteners for releasably coupling the second outer frame member to the second backing member; and second coupling means for coupling the first and second backing members back-to-back with each other.

7. A display card holder as in claim 6, wherein each of said first and second outer frame members has a lip adapted to overhang and cover at least a portion of the side edge of each of said first and second backing members respectively.

8. A display card holder as in claim 6, wherein said second backing member has a plurality of protrusions adjacent to the periphery thereof, and said second outer frame member has a periphery of substantially the same size and shape of at least a portion of the periphery of said second backing member and a plurality of recesses to engage said plurality of protrusions, said second plurality of fasteners being adapted to effect clamping the card at its periphery between said plurality of protrusions on said second backing member and said plurality of recesses provided in said second outer frame member.

9. A display card holder for receiving a card, the display card holder being adapted for use with a shopping cart having a wall, the display card holder comprising:

a first backing member having a periphery and a plurality of protrusions adjacent to the periphery, the periphery including at least a side edge;

first coupling means for coupling said first backing member to the wall;

a first outer frame member having a periphery of substantially the same size and shape of at least a portion of the periphery of said first backing member and a plurality of recesses to receive said plurality of protrusions provided on said first backing member, at least one of the plurality of protrusions in the backing member having a card engaging surface for engagement with a card and at least one of the plurality of the recesses being positioned to mate with the card engaging surface;

a first plurality of fasteners for releasably fastening the first outer frame member and the first backing member together;

a second backing member, the second backing member having a periphery, the periphery including at least a side edge;

a second outer frame member;

a second plurality of fasteners for releasably coupling the second outer frame member to the second backing member; and second coupling means for coupling the first and second backing members back-to-back with each other;

wherein each of said first and second backing members has a front surface and a rear surface, and includes plurality of studs on the rear surface to space a distance between said first and second backing members, each of said first and second backing members defines a plurality of recesses in the rear surface which receives said plurality of studs therein.

10. A display card holder as in claims 9, wherein said plurality of studs and said plurality of recesses are provided adjacent the periphery of each of said first and second backing members.

11. A display card holder as in claim 10, wherein each of said first and second backing members defines a first aperture provided at each of said plurality of recesses, each of said plurality of studs defines therein a second aperture, and each of said first and second coupling means comprises screws wherein each of said screws is screwed through said first aperture to said second aperture for coupling said first backing member to said second backing member.

12. A display card holder for receiving a card, the display card holder being adapted for use with a shopping cart having a basket, the basket including a wall having at least a horizontal wire, the display card holder comprising:

a pair of backing members each having a front surface and a rear surface, each of said backing members having in the rear surface thereof a plurality of recesses and a plurality of studs to engage said plurality of recesses;

a plurality of screws for coupling said pair of backing members back-to-back with a wall of the cart therebetween, said plurality of screws each having a head and extending through each of said pair of backing members at said plurality of recesses in the rear surface to said plurality of studs, said heads of said screws protruding on the front surface of each of said pair of backing members when said pair of backing members are connected to each other;

a pair of outer frame members each having a periphery of substantially the same size and shape of at least a portion of the periphery of each of said backing members, each of said pair of outer frame members having a plurality of recesses for receiving said heads of said screws, at least one of the plurality of protruding screw heads in each of the backing members having a card engaging surface for engagement with a card and at least one of the plurality of the recesses in each of the outer frame members being positioned to mate with the card engaging surface; and a plurality of fasteners for releasably fastening each of said pair of outer frame members to each of said pair of backing members respectively, said plurality of fasteners being adapted to effect clamping a card at its periphery between said heads of said screws and said plurality of recesses provided in each of said outer frame members.

13. A display card holder for receiving a card, the display card holder being adapted for use with a shopping cart having a basket, the display card holder comprising:

a pair of backing members each having a front surface and a rear surface, each of said backing members having in the rear surface thereof a plurality of recesses and a plurality of studs to engage said plurality of recesses;

a plurality of screws for coupling said pair of backing members back-to-back with a wall of the cart therebetween, said plurality of screws each having a head and extending through each of said pair of backing members at said plurality of recesses in the rear surface to said plurality of studs, said heads of said screws protruding on the front surface of each of said pair of backing members when said pair of backing members are connected to each other;

a pair of outer frame members each having a periphery of substantially the same size and shape of at least a portion of the periphery of each of said backing members, each of said pair of outer frame members having a plurality of recesses for receiving said heads of said screws; and a plurality of fasteners for releasably fastening each of said pair of outer frame members to each of said pair of backing members respectively, said plurality of fasteners being adapted to effect clamping the card at its periphery between said heads of said screws and said plurality of recesses provided in each of said outer frame members;

wherein each of said pair of backing members has at least one protrusion provided on the front surface thereof, said at least one protrusion being adapted to engage at least one of said recesses defined in each of said outer frame members, wherein said at least one protrusion provided on the front surface of each of said backing members includes a card engaging surface for engagement with a card and the at least one of said recesses defined in each of said outer frame members receives the card engaging surface when each of said outer frame members is secured to each of said backing members.

14. A display card holder for receiving a card, the display card holder being adapted for use with a shopping cart having a basket, the display card holder comprising:

a pair of backing members each having a front surface and a rear surface, each of said backing members having in the rear surface thereof a plurality of recesses and a plurality of studs to engage said plurality of recesses;

a plurality of screws for coupling said pair of backing members back-to-back with a wall of the cart therebetween, said plurality of screws each having a head and extending through each of said pair of backing members at said plurality of recesses in the rear surface to said plurality of studs, said heads of said screws protruding on the front surface of each of said pair of backing members when said pair of backing members are connected to each other;

a pair of outer frame members each having a periphery of substantially the same size and shape of at least a portion of the periphery of each of said backing members, each of said pair of outer frame members having a plurality of recesses for receiving said heads of said screws; and a plurality of fasteners for releasably fastening each of said pair of outer frame members to each of said pair of backing members respectively, said plurality of fasteners being adapted to effect clamping the card at its periphery between said heads of said screws and said plurality of recesses provided in each of said outer frame members;

wherein each of said pair of backing members has at least one protrusion provided on the front surface thereof, said at least one protrusion being adapted to engage at least one of said recesses defined in each of said outer frame members, said at least one protrusion provided on the front surface of each of said backing members includes a card engaging surface for engagement with a card and the at least one of said recesses defined in each of said outer frame members receives the card engaging surface when each of said outer frame members is secured to each of said backing members;

wherein each of said backing members has a periphery, and said plurality of recesses and said plurality of studs in the rear surface of each of said backing members are provided adjacent to the periphery thereof.

15. A display card holder as in claim 14, wherein said heads of said screws and said at least one protrusion on said front surface of each of said backing members are provided adjacent to the periphery thereof.

16. A display card holder as in claim 15, wherein said heads of said screws and said at least one protrusion on said front surface are covered by each of said outer frame members respectively.

17. A display card holder for receiving a card, the display card holder being adapted for use with a shopping cart having a basket, the basket including a wall having at least a horizontal wire, the display card holder comprising:

a pair of backing members each having a front surface and a rear surface, each of said backing members having in the rear surface thereof a plurality of recesses and a plurality of studs to engage said plurality of recesses, wherein each of said pair of backing members includes at least one pair of holding pins to engage the horizontal wire in the basket for substantially preventing a vertical movement of said pair of backing members;

a plurality of screws for coupling said pair of backing members back-to-back with a wall of the cart therebetween, said plurality of screws each having a head and extending through each of said pair of backing members at said plurality of recesses in the rear surface to said plurality of studs, said heads of said screws protruding on the front surface of each of said pair of backing members when said pair of backing members are connected to each other;

a pair of outer frame members each having a periphery of substantially the same size and shape of at least a portion of the periphery of each of said backing members, each of said pair of outer frame members having a plurality of recesses for receiving said heads of said screws, at least one of the plurality of protruding screw heads in each of the backing members having a card engaging surface for engagement with a card and at least one of the plurality of the recesses in each of the outer frame members being positioned to mate with the card engaging surface; and a plurality of fasteners for releasably fastening each of said pair of outer frame members to each of said pair of backing members respectively, said plurality of fasteners being adapted to effect clamping a card at its periphery between said heads of said screws and said plurality of recesses provided in each of said outer frame members.

\* \* \* \* \*